No. 892,219. PATENTED JUNE 30, 1908.
A. J. BRYANT.
MOUNTING FOR MUD GUNS.
APPLICATION FILED AUG. 21, 1905.
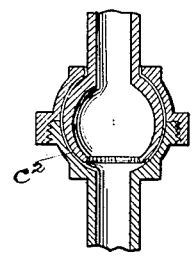
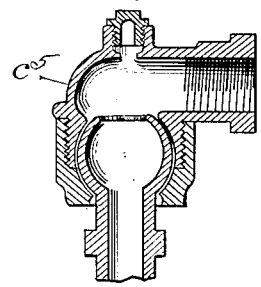
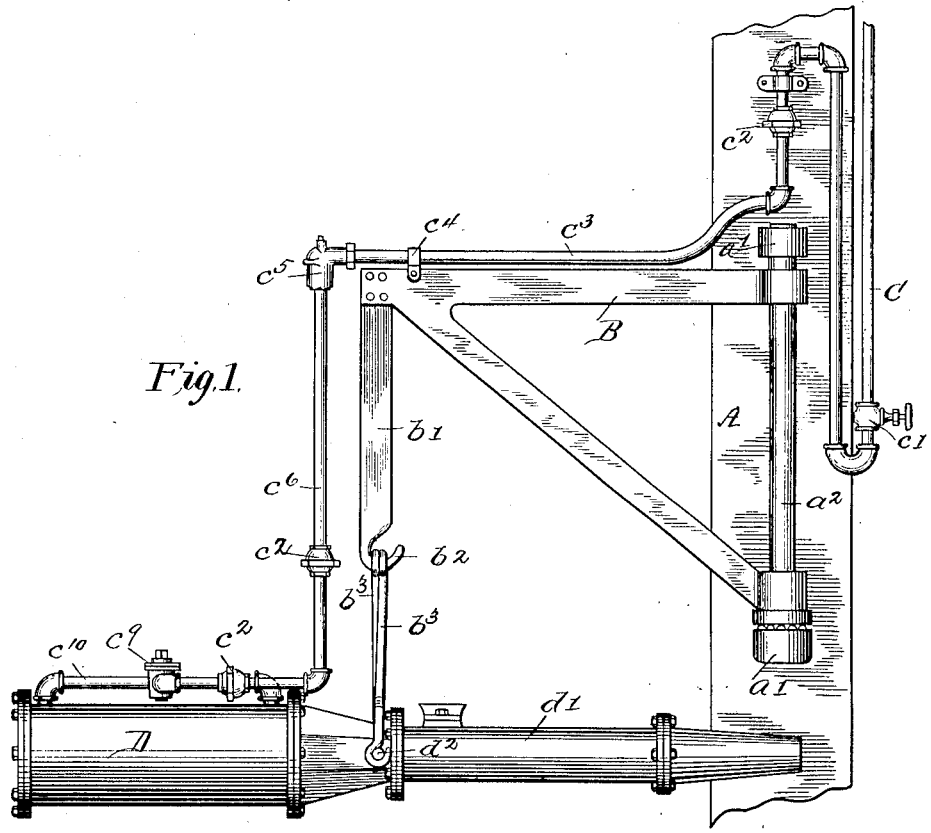
WITNESSES
Chas. F. Bassett
M. A. Milard.
INVENTOR
A. J. Bryant
By
Frederick Benjamin
ATTY

UNITED STATES PATENT OFFICE.

ANDREW J. BRYANT, OF SHEFFIELD, ALABAMA.

MOUNTING FOR MUD-GUNS.

No. 892,219.  Specification of Letters Patent.  Patented June 30, 1908.

Application filed August 21, 1905. Serial No. 275,000.

*To all whom it may concern:*

Be it known that I, ANDREW J. BRYANT, citizen of the United States, residing at Sheffield, in the county of Colbert and State of Alabama, have invented certain new and useful Improvements in Mountings for Mud-Guns, of which the following is a specification.

This invention relates to improvements in apparatus for mounting furnace mud guns or similar devices and for effecting flexible steam connections therefor.

The improvements consist generally in the arrangement of the steam pipes and in the means for supporting the mud gun so that it can be easily handled. As an element in connection with the steam pipes, I utilize a flexible pipe joint of well known form, and I do not claim the mud-gun as a part of my invention.

In the accompanying drawings:—Figure 1 is a view in side elevation showing a mud gun mounted and connected in accordance with my invention; Fig. 2 is a section of one form of flexible pipe-joint employed in my invention, and Fig. 3 is a sectional view of another form of flexible pipe joint used by me.

Referring to the drawings in detail A represents a section of timber, or wall or other upright construction to which the operative parts of my invention are connected. $a^1, a^1$ are brackets which are secured to A, extend horizontally therefrom and furnish bearings for the vertical shaft $a^2$. Loosely mounted on the shaft $a^2$ is a crane B which swings freely on the shaft, and has a ball bearing at its lower end with the bracket $a^1$. From the outer end of the crane depends an arm $b^1$ which terminates in a hook $b^2$ which engages eyes in the upper end of two links $b^3, b^3$.

C represents the first section of a steam pipe which is connected with any suitable source of steam supply. This pipe is supplied with a hand valve $c^1$ with suitable elbows and is connected with the support A and has coupled near its end a flexible joint $c^2$ shown in detail in Fig. 3. A horizontal section of pipe $c^3$ is connected at one end with C by a suitable elbow, and is secured to the top of the crane B by a collar $c^4$. The section $c^3$ terminates in an angular flexible joint $c^5$ which serves as a coupling between the horizontal section $c^3$ and the vertical pipe section $c^6$. In this latter section a flexible joint $c^7$ is inserted, and the lower end of the pipe communicates with a horizontal pipe section $c^{10}$ in which are arranged a flexible joint $c^8$ and a hand valve $c^9$. The end of the steam pipe section $c^{10}$ connects with the mud-gun steam cylinder D. This cylinder is supplied with the usual nozzle or spout $d^1$, and is also provided with trunnions $d^2$ which are engaged by the hooks on the lower ends of the links $b^3$, thus furnishing a swinging support for the mud-gun. The constructions of the flexible joints $c^2$ and $c^5$ are clearly shown in Figs. 2 and 3 respectively, and as they are devices in common use and form *per se* no part of my invention, need not be described in detail.

From the construction described it will be apparent that the joint connecting the pipe sections C, $c^3$ will permit the crane and the attached parts to swing freely on the shaft $a^2$; that the joint $c^5$ will permit the gun to be swung outwardly from the crane, the joint representing the axis; that the joints connecting the pipe sections $c^6$ and $c^{10}$ will permit the gun to be tilted at any desired angle, and the combination and arrangement of the joints practically provide a universal movement of the gun throughout a wide range thus permitting its easy handling and most effective use.

It will be apparent that the pipe connections and attachments shown may be used in mounting steam or pneumatically operated devices of various kinds, hence I do not wish to be limited by my patent to the apparatus as applied to a furnace mud gun, but

What I claim and desire to secure by Letters Patent, is:—

A mounting and supporting apparatus of the character described, comprising a swinging crane having a depending arm, provided with a hook supporting links depending from said hook and adapted to swing both longitudinally and laterally, said links having hooks at their lower ends, vertically and horizontally arranged pipes connected with and supported by said crane, and universal pipe joints inserted in said pipes, whereby the latter may be moved in any direction for the purpose set forth.

In testimony whereof I affix my signature in presence of two witnesses.

ANDREW J. BRYANT.

Witnesses:
D. P. REESE,
H. SPIELBERGER.